United States Patent [19]
Pesendorfer

[11] 3,869,133
[45] Mar. 4, 1975

[54] FLEXIBLE SEALING DEVICE

[75] Inventor: Alfred Pesendorfer, Rutihof/Ag, Switzerland

[73] Assignee: Brown Boveri Selzer Turbomaschinen AG, Zurich, Switzerland

[22] Filed: Apr. 9, 1973

[21] Appl. No.: 349,126

[52] U.S. Cl. ................................ 277/27, 277/75
[51] Int. Cl. .......................................... F16j 15/40
[58] Field of Search ............ 277/76, 27, 180, 28, 75

[56] References Cited
UNITED STATES PATENTS
3,119,623    1/1964    Shevchenko .......................... 277/27

*Primary Examiner*—Harry N. Haroian
*Attorney, Agent, or Firm*—Pierce, Scheffler & Parker

[57] ABSTRACT

A flexible sealing device forming a separable joint between two components comprises a series of spring-loaded metallic seal segments arranged in end-to-end relation along a seal line and which operate in a gap between holders secured to one of the components and are pressed against the surface of the other component as the two components are moved towards each other. Each seal segment is composed of two halves separated by a longitudinal gap therebetween, the seal segment halves include half-round cut-outs forming circular holes in which loading springs and balls are received and function to force the end surfaces of the seal segments into pressure contact with the other component as well as force the sides of the seal segment halves laterally into pressure contact with the side of the corresponding holder, and a sealing gas is caused to flow through the gaps between the seal segment halves to reach the junction between the seal segments and the surface of the other components.

6 Claims, 3 Drawing Figures

FLEXIBLE SEALING DEVICE

The present invention relates to a flexible sealing device forming a separable joint between two components, metallic sealing elements joined to one component being pressed against the other component by springs.

Devices of this kind are used, for example, in steelworks to provide a seal between the flanges of the combustor and charging box. When the charge is changed, roughly every ten minutes, the combustor is raised slightly, the box is changed and the combustor is replaced in position. Even though the procedure is fast, an adequate seal is essential. Hitherto a double row of sealing strips has been used, sealing air being blown between the two rows. The metal strips are only approximately 0.5 mm thick, which is the reason why the inner row of strips becomes burned by the hot gases. Also, the strips are often bent by pieces of scrap lying on the rim of the charging box when the combustor is lowered. The seal therefore has only a very short life, and has to be renewed frequently.

The object of the invention is to create a flexible but rugged sealing device providing an adequate seal which can be made and broken again quickly under industrial conditions and which is durable despite rough treatment.

This object is achieved in that pairs of sealing elements, preferably symmetrical in cross-section and separated from each other by a gap, are, when in the sealing position, pressed against their sealing surfaces and against lateral holders by spring-loaded balls, and a sealing gas under pressure flows through the gap.

This device provides a reliable seal against hot gases and other gases which must not escape into the surrounding atmosphere. No bolted or other forms of attachment are required, i.e. the device can be released immediately by lifting one component from the other, or brought into the operating position by pressing the components together, for which their own weights can be sufficient. Because the sprung sealing elements are flexible the components can be inclined with respect to each other, limited relative displacement in any direction can be compensated during operation, and even if the sealing surfaces are uneven or have foreign bodies on them the resilience of the sealing elements in conjunction with the sealing gas ensure a seal of the required quality.

An example of the invention is illustrated in the accompanying drawings, in which.

In all the figures the same reference numbers are used for the same parts.

Figure 1:
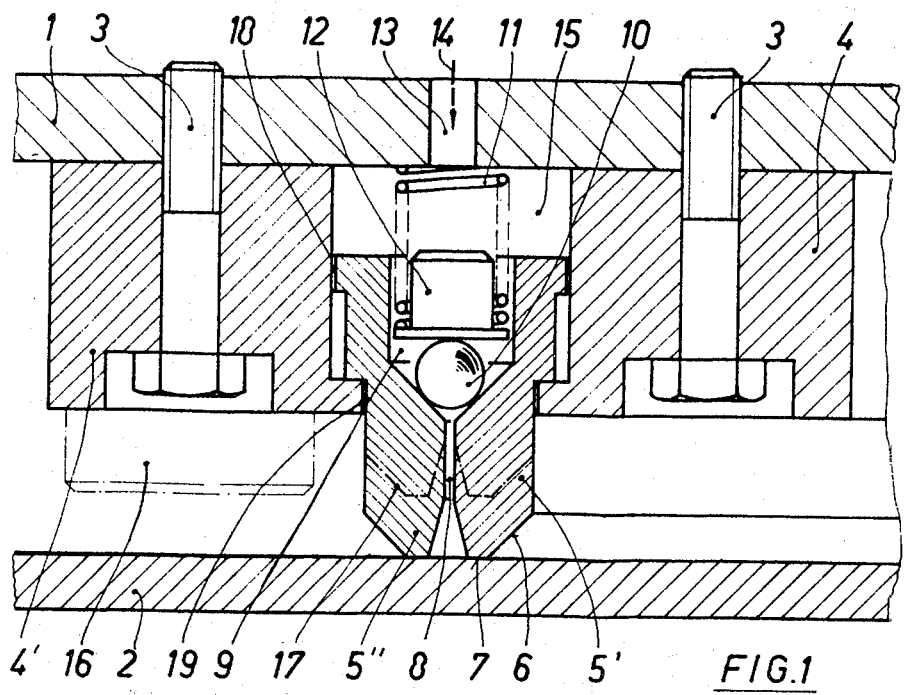
FIG. 1 shows a section through the sealing device.

The drawing shows a sealing device for two flanges denoted 1 and 2. Inner and outer radially spaced annular holders 4,4' are fixed to circular flange 1 with screw bolts 3 and establish an annular gap therebetween. The purpose of these holders is to hold and guide in the gap segmental sealing elements 5, which are of a metal such as steel and symmetrical in cross-section. The chamfer 6 on the outward-facing sides of the sealing elements 5 has the effect of greatly reducing the sealing area 7 bearing on flange 2.

The segmental sealing elements 5 which are made in the form of radially spaced circumferentially extending halves 5',5" have between them a circumferential gap 8. Also each sealing segment half incorporates one half of cylindrical hole 9, which terminates in a cone. The hollow cone of each hole 9 contains a ball 10 which is pressed into the cone by a helical spring 11, one end of which bears on flange 1 and into the opposite end of which is received a plug 12 which presses against the ball.

Sealing air is admitted to the annular gap 15 through the hole 13 in flange 1 as indicated by the arrows 14, the air filling gap 8 and holes 9 and flowing to the seal area at the chamfered ends of the sealing segment 5.

The sealing device functions in the following manner. End-stops 16 are attached to the outer holder 4'. When flanges 1 and 2 are first moved towards each other, it being immaterial which of the two flanges moves, the sealing surfaces 7 of sealing elements 5 first engage flange 2. When the flanges come closer together, the sealing elements are pressed into the annular gap 15 between holders 4,4' against the force of the springs 11. When the end-stops 16 come in contact with flange 2, the sealing elements assume the position indicated for their lower portion by the broken line 17. The purpose of ball 10 is then not only to transfer the spring force to the sealing elements, in order to press them against flange 2, but also the pressure of ball 10 on the walls of the hollow cone in hole 9 exerts a force perpendicular to the contact pressure, forcing the sealing elements 5',5" apart and thus improving the seal at lateral sealing surfaces 18 and 19 between the sealing segments 5 and the inner and outer holder rings 4,4'.

Figure 3:
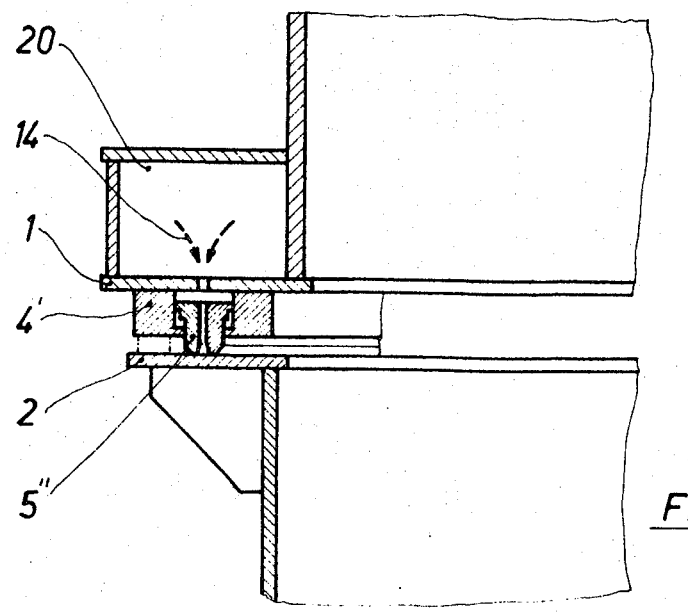
FIG. 3 is a similar section to that shown in FIG. 1 with the neighbouring components, on a smaller scale.

The sealing gas flowing out of annular chamber 20 to the sealing device, as shown in FIG. 3, must be at a higher pressure than the space to be sealed. It is then inevitable that sealing gas will escape to either side through leaks at sealing surfaces 7, but this in turn ensures that hot gas, for example, does not escape from the space to be sealed.

It would not be reasonable to allow sealing gas to continue discharging while the sealing device is in the raised position. This can easily be prevented by means of a switch, for example, which is operated by the moving flange. When the joint is disconnected it shuts off the supply of sealing gas, and opens up the supply again when the sealing device is again placed in position.

Assembling the sealing device presents no difficulty. As can be seen from FIG. 2, the sealing elements 5 are divided in the circumferential direction into segments, each containing three holes 9. A piece 21 somewhat wider than one sealing element i.e. circumferentially is cut out from outer holder 4'. Piece 21 is held in place by dowel pins 22, which also act to some extent as a seal, and fixed to flange 1 by bolts 3. The sealing elements, together with the appropriate number of balls, springs 11 and plugs 12, are passed through this opening in pairs and slid to their position between the holders 4,4'. This can be done without exerting force because the springs can be fitted with very little initial tension. The sealing elements are thus inserted one after the other, and the piece 21 is then placed in position.

Thirty pairs of sealing elements, for example, can be distributed round the circumference, the spring deflection being 10 mm. The number of elements, the spring force and spring deflection can of course be adapted to suit requirements.

Figure 2:
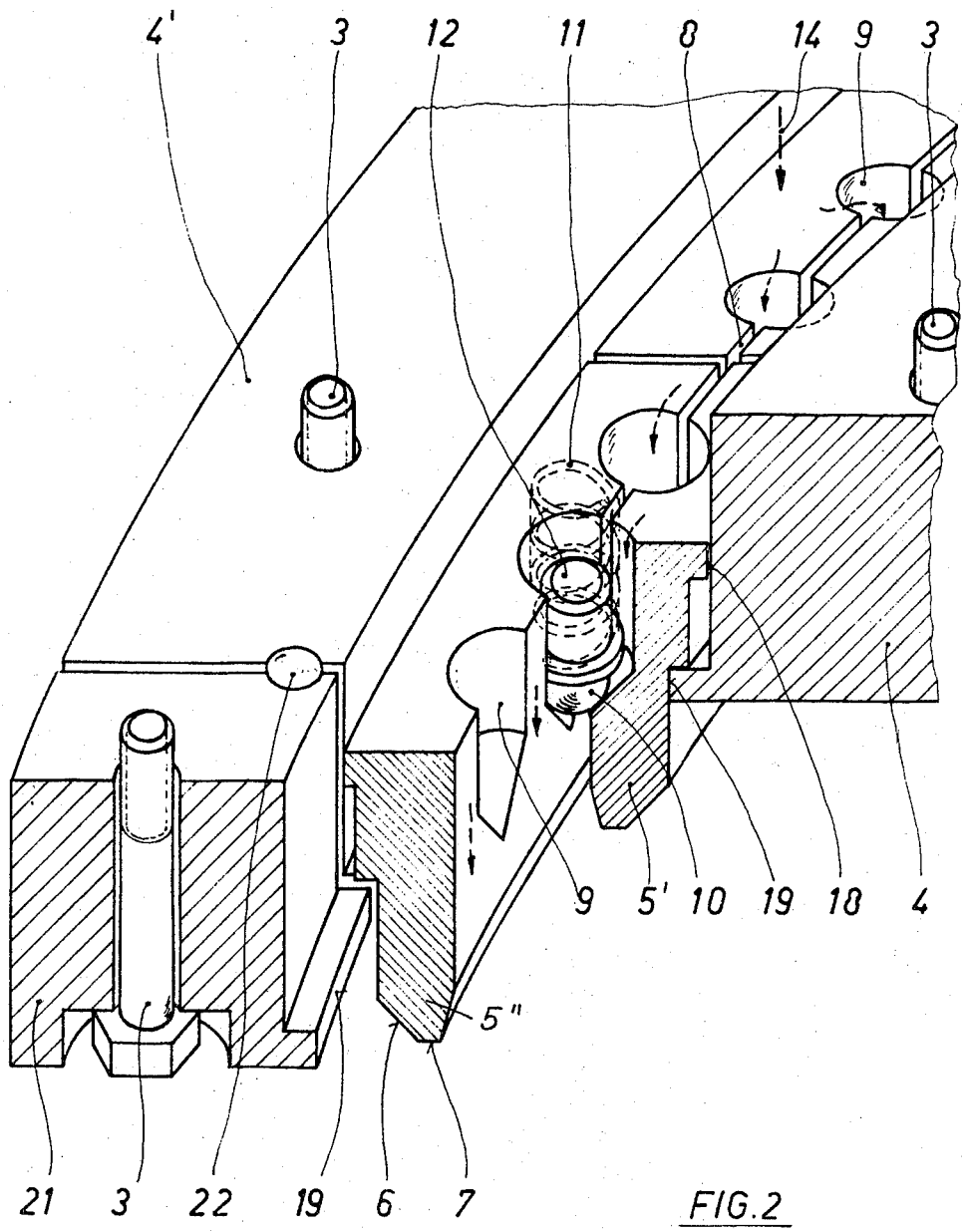
FIG. 2 is a perspective view of an exposed, partly sectioned portion of the sealing device.

As can further be seen from FIG. 2, there are small spaces between the pairs of elements. If the device is required to provide a more effective seal, one row of elements can be offset by the centre distance between two holes. The spaces then no longer pass straight between two rows of elements, but are themselves also offset. It is evident that in this case the demands on precision will be much more exacting, and also the sealing elements can no longer be inserted in pairs and slid to their position, but can only be fitted when attached to each other, which would require considerable effort. In the case of a seal between flanges it would be necessary to make one of the lateral holders in at least three pieces in order to be able to fit it after all the sealing elements are in place.

It should further be noted that the sealing device described can be used to seal either horizontal or vertical surfaces, and also that it can be circular, straight or of any other configuration. The application of the device extends to all cases where an adequate seal has to be achieved simply by pressing together two components which are not exactly parallel and flat.

I claim:

1. In a flexible sealing device forming a separable joint between two components which comprises a series of metallic seal segments arranged in end-to-end relation, said seal segments being supported by one of said components and being pressed against the surface of the other component by spring means, the improvement wherein said series of seal segments operate within a gap formed between two holders which are secured to one of said components, wherein each said seal segment is composed of two halves separated by a longitudinally extending gap therebetween, wherein said spring means include loading springs and balls which serve to force the end surfaces of said seal segments into pressure contact with the other component and to force the sides of said seal segment halves laterally into pressure contact with the side of the corresponding holder, and wherein a sealing gas is caused to flow through the gaps between the halves of each seal segment to reach the seal junction between said seal segments and the surface of said other component.

2. A flexible sealing device as defined in claim 1 wherein said sealing gas is introduced into the gap formed between said holders for flow through the gaps between the halves of each seal segment.

3. A flexible sealing device as defined in claim 1 wherein the halves of seal segments include half-round cut-outs forming circular holes in which said loading springs and balls are received, and each ball presses against a cone portion of the hole.

4. A circular axially flexible sealing device forming a separable joint between two circular components comprising a pair of radially spaced annular holders, means securing said annular holders to one of said circular components, a circular metallic seal member disposed in the annular gap established between said annular holders and which projects below the holders towards the other circular component, said seal member being divided in the circumferential direction into segments, and each said seal segment itself being divided in a circumferential direction into inner and outer radially spaced halves thereby to establish a circumferentially extending gap therebetween, each said seal segment including a plurality of circumferentially spaced cylindrical holes formed between the segment halves and which terminate in hollow cones, a ball seated in the cone portion of each hole, a loading spring for each ball located in each hole, said loading springs applying a pressure against said balls thereby to press the ends of said seal segments into sealing contact with said other circular component as said components are moved towards each other, and said loading springs also acting through said balls to force said seal segment halves apart in a radial direction thereby to press the sides thereof into sealing contact with the adjoining sides of said annular holders, and means for introducing a sealing gas into the annular gap between said annular holders for flow therethrough in an axial direction in the circumferentially extending gap formed between the inner and outer halves of said seal segments thereby to reach the seal junction between said seal segments and the surface of said other circular component.

5. A sealing device as defined in claim 4 wherein the radially outer annular holder is provided with a removable circumferentially extending segment providing a gap through which said seal segments together with their loading springs and balls can be inserted into their positions in the annular gap established between said annular holders.

6. A sealing device as defined in claim 4 wherein said loading springs abut the surface of the circular component to which said annular holders are secured thus to form a stop resulting in compression of the springs so as to apply a force against the balls as said circular components are moved towards one another, and wherein said sealing gas is introduced into said annular gap between said annular holders through openings provided in said circular component in alignment with said gap.

* * * * *